US006839059B1

(12) United States Patent
Anderson et al.

(10) Patent No.: US 6,839,059 B1
(45) Date of Patent: Jan. 4, 2005

(54) SYSTEM AND METHOD FOR MANIPULATION AND INTERACTION OF TIME-BASED MIXED MEDIA FORMATS

(75) Inventors: Matthew Carl Anderson, Los Angeles, CA (US); Richard Prentiss Jensen, Los Angeles, CA (US); Joshua Dov Joseph Sharfman, Los Angeles, CA (US)

(73) Assignee: Interactive Video Technologies, Inc., New York, NY (US)

( * ) Notice: Subject to any disclaimer, the term of this patent is extended or adjusted under 35 U.S.C. 154(b) by 725 days.

(21) Appl. No.: 09/654,101

(22) Filed: Aug. 31, 2000

(51) Int. Cl.$^7$ ............................................. G06T 15/00
(52) U.S. Cl. ..................................................... 345/501
(58) Field of Search .................................. 345/501, 502, 345/520, 522, 473, 474, 475; 707/102, 100, 101; 709/246, 247

(56) References Cited

U.S. PATENT DOCUMENTS

| | | | |
|---|---|---|---|
| 5,440,678 A | 8/1995 | Eisen et al. .................. | 345/720 |
| 5,461,711 A | 10/1995 | Wang et al. ................. | 345/720 |
| 5,515,490 A | 5/1996 | Buchanan et al. ........ | 715/500.1 |
| 5,537,546 A | 7/1996 | Sauter ......................... | 709/230 |
| 5,585,838 A | 12/1996 | Lawler et al. ................. | 725/54 |
| 5,592,602 A | 1/1997 | Edmunds et al. ........... | 345/474 |
| 5,613,909 A | 3/1997 | Stelovsky ....................... | 463/1 |
| 5,623,690 A | 4/1997 | Palmer et al. ............ | 715/500.1 |
| 5,634,062 A | 5/1997 | Shimizu et al. .............. | 345/853 |
| 5,680,639 A | 10/1997 | Milne et al. .............. | 715/500.1 |
| 5,704,791 A | 1/1998 | Gillio .......................... | 434/262 |
| 5,727,159 A | 3/1998 | Kikinis ..................... | 715/500.1 |
| 5,745,782 A | 4/1998 | Conway ................... | 715/500.1 |
| 5,748,186 A | 5/1998 | Raman ..................... | 715/500.1 |
| 5,751,281 A | 5/1998 | Hoddie et al. ........... | 715/500.1 |
| 5,751,968 A | 5/1998 | Cohen ......................... | 709/201 |
| 5,767,846 A | 6/1998 | Nakamura et al. ....... | 715/500.1 |
| 5,794,249 A | 8/1998 | Orsolini et al. ................ | 707/1 |

(List continued on next page.)

FOREIGN PATENT DOCUMENTS

| | | |
|---|---|---|
| WO | 9746957 | 12/1997 |
| WO | 9854637 | 12/1998 |

OTHER PUBLICATIONS

"Document Object Model (Core) Level I [http://www.w3.org/TR/REC-DOM-Level-I/level-one-core-.html]", Champion, Mike [Arbor Text (from Nov. 20, 1997)]; Byrne, Steve [JavaSoft (until Nov. 19, 1997)]; Nicol, Gavin [Inso EPS]; Wood, Lauren [SoftQuad, Inc.]; Feb. 17, 1999; pp. 1–30.

"A Method for Interactive Control of Animation Images in a Hyper Text Document", Research Disclosure, vol. 41, No. 410, Jun. 1, 1998, XP002144619, Havant, UK, Article No. 41089 (4 pgs.).

Moseley, Lonnie E. et al., Mastering Microsoft Office 97 Professional Edidtion, $2^{nd}$ Ed., Jan. 1997 SYBEX Corporation, pp. 637–651, 655–669, 673–689, 771–723.

*Primary Examiner*—Phu K. Nguyen
(74) *Attorney, Agent, or Firm*—Jones Day

(57) ABSTRACT

A system and method for efficiently creating a multi-media presentation, as well as allowing for searching through the presentation to retrieve and display desired subject matter within the presentation. The invention provides software that allows a user to record audio clips for one or more of the screens of the presentation, in any order, and in various manners. In addition, the invention maintains a searchable text file to allow a user to find desired subject matter within the presentation, and to display the corresponding screen(s).

60 Claims, 13 Drawing Sheets

U.S. PATENT DOCUMENTS

| | | | |
|---|---|---|---|
| 5,801,791 A | 9/1998 | Yamazaki et al. | 348/629 |
| 5,805,763 A | 9/1998 | Lawler et al. | 386/83 |
| 5,815,663 A | 9/1998 | Uomini | 709/219 |
| 5,819,302 A | 10/1998 | Nielsen | 715/523 |
| 5,822,537 A | 10/1998 | Katseff et al. | 370/231 |
| 5,822,720 A | 10/1998 | Bookman et al. | 345/157 |
| 5,826,102 A | 10/1998 | Escobar et al. | 345/835 |
| 5,828,809 A | 10/1998 | Chang et al. | 386/68 |
| 5,845,299 A | 12/1998 | Arora et al. | 715/513 |
| 5,845,303 A | 12/1998 | Templeman | 715/514 |
| 5,861,880 A | 1/1999 | Shimizu et al. | 345/723 |
| 5,870,552 A | 2/1999 | Dozier et al. | 709/219 |
| 5,892,507 A | 4/1999 | Moorby et al. | 345/723 |
| 5,893,110 A | 4/1999 | Weber et al. | 707/100 |
| 5,907,850 A | 5/1999 | Krause et al. | 345/854 |
| 5,930,514 A | 7/1999 | Thompson et al. | 707/206 |
| 5,956,729 A | 9/1999 | Goetz et al. | 345/760 |
| 5,956,736 A | 9/1999 | Hanson et al. | 715/513 |
| 5,983,236 A | 11/1999 | Yager et al. | 707/102 |
| 5,983,243 A | 11/1999 | Heiney et al. | 715/500 |
| 5,987,480 A | 11/1999 | Donohue et al. | 715/500.1 |
| 5,991,756 A | 11/1999 | Wu | 707/4 |
| 5,991,795 A | 11/1999 | Howard et al. | 707/3 |
| 6,005,560 A | 12/1999 | Gill et al. | 715/500.1 |
| 6,006,242 A | 12/1999 | Poole et al. | 709/201 |
| 6,021,426 A | 2/2000 | Douglis et al. | 709/200 |
| 6,061,696 A | 5/2000 | Lee et al. | 715/513 |
| 6,081,262 A | 6/2000 | Gill et al. | 715/500.1 |
| 6,083,276 A | 7/2000 | Davidson et al. | 717/107 |
| 6,096,095 A | 8/2000 | Halstead | 717/107 |
| 6,128,629 A | 10/2000 | Bretschneider et al. | 707/203 |
| 6,141,001 A | 10/2000 | Baleh | 715/500.1 |
| 6,181,332 B1 | 1/2001 | Salahshour et al. | 715/500.1 |
| 6,199,082 B1 | 3/2001 | Ferrel et al. | 715/522 |
| 6,230,173 B1 | 5/2001 | Ferrel et al. | 715/513 |
| 6,253,217 B1 | 6/2001 | Dourish et al. | 715/500 |
| 6,269,122 B1 | 7/2001 | Prasad et al. | 348/515 |
| 6,278,992 B1 | 8/2001 | Curtis et al. | 715/500 |
| 6,324,569 B1 | 11/2001 | Ogilvie et al. | 709/206 |
| 6,356,920 B1 | 3/2002 | Vandersluis | 715/501.1 |
| 6,507,848 B1 | 1/2003 | Crosby et al. | 707/102 |
| 6,573,907 B1 * | 6/2003 | Madrane | 345/719 |
| 6,585,777 B1 | 7/2003 | Ramaley et al. | 707/100 |
| 6,654,933 B1 | 11/2003 | Abbott et al. | 345/745 |
| 2001/0056434 A1 | 12/2001 | Kaplan et al. | 707/104.1 |
| 2002/0095460 A1 | 7/2002 | Benson | 709/204 |
| 2003/0061566 A1 | 3/2003 | Rubstein et al. | 715/500.1 |

* cited by examiner

SYSTEM AND METHOD FOR MANIPULATION AND INTERACTION OF TIME-BASED MIXED MEDIA FORMATS

CROSS-REFERENCE TO RELATED APPLICATIONS

This application contains subject matter that may be considered related to the subject matter disclosed in U.S. patent application Ser. No. 09/654,102, entitled SYSTEM AND METHOD FOR ASSEMBLING DISCRETE DATA FILES INTO AN EXECUTABLE FILE AND FOR PROCESSING THE EXECUTABLE FILE; Ser. No. 09/652,725, entitled SYSTEM AND METHOD FOR CONTROLLING SYNCHRONIZATION OF A TIME-BASED PRESENTATION AND ITS ASSOCIATED ASSETS; and Ser. No. 09/652,726, entitled SYSTEM AND METHOD FOR TRANSFORMING DATA INTO A TEMPLATE-BASED FORMAT, all filed on Aug. 31, 2000, the contents each being hereby expressly incorporated by reference.

FIELD OF THE INVENTION

The present invention relates to a system and method for collecting and assembling data for subsequent presentation to a recipient. More particularly, the invention relates to a system and method that provides an improved interface to facilitate the creation of such a presentation.

BACKGROUND OF THE INVENTION

Information is collected and presented to people in many different ways. Written text, in the form of books, newspapers, and magazines, represent one conventional way of presenting readers with information. Electronically, the written text, in the form of text data, may be presented to people over a computer or other similar device. For example, people may access a web site that provides news and other textual information, along with information in other media formats, such as pictures and other images.

Another way in which information is presented to people is via a presentation, in which a person communicates such information to a person or group of persons. To assist the presenter in communicating such information, conventionally an overhead projector is used to display a sequence of transparent slides, with each slide typically consisting of text and/or some graphical image.

With computers gaining in terms of popularity, such presentations are often carried out through the use of a computer running appropriate software. One example of such software is PowerPoint™ available from Microsoft Corporation. As is well known in the art, PowerPoint™ creates a series of screen slides that typically include written text, and that may include a graphical image or the like. The screens are arranged in some order as dictated by the author. During presentation, the screens are displayed, with the progression from one screen to another being controlled by the presenter, or alternatively being performed automatically by the software.

While such software provides significant benefits and advantages, there are still disadvantages associated therewith. For example, in a conventional presentation, the author must bring the presentation, run PowerPoint™, and carry out the presentation. There is no provision for on-demand sharing of the presentation. In addition, such software makes it cumbersome and restrictive to record audio clips for the respective slides.

Moreover, in a conventional PowerPoint™ presentation, if there are associated sound files, the presentation becomes excessively large, thereby making it difficult to share PowerPoint™ files that include audio clips for one or more of the screen slides. In addition, if an author of a PowerPoint™ presentation wishes to share the presentation with recipients, those recipients must have either PowerPoint™ or PowerPoint™ Viewer software on their machines in order to view the presentation.

Thus, it would be desirable to have a system and method that facilitate the creation of a multi-media presentation, and that provide an efficient means for a recipient to navigate through the presentation to find desired subject matter. In addition, it would be desirable to have such a system and method that allow an author to record audio clips in an improved manner. Moreover, it would be desirable to create presentations that are compact in electronic file size to facilitate sharing the presentations. And, it would be desirable to have a system that creates a packaged, executable presentation that can be viewed via a conventional web browser, without the need for any additional software. The need also exists to distribute the presentation over a communications network in a streaming media format, thereby mitigating the need for the recipient to download the entire presentation before beginning to view it. The present invention addresses one or more of these desirable features.

SUMMARY OF THE INVENTION

The present invention provides a system and method for creating a multi-media presentation. In one embodiment, the system and method allow a recipient of the presentation to search through the presentation to retrieve and display desired subject matter. The system preferably includes software that allows an author to record audio clips (e.g., narration) for one or more of the screens of the presentation, in any order, and in various manners. In addition, the system preferably maintains an internal, searchable data file with associated timing information to allow a recipient to find desired subject matter within the presentation, and to display the corresponding screen(s). Moreover, the system may transform the plurality of files that comprise the presentation into an executable file that can be viewed with a conventional web browser.

Thus, in one embodiment, the invention is directed to a method of preparing a mixed media presentation. Initially, plural sets of text data are received for insertion into respective screen slides. Audio data for one or more of the screen slides may also be received. The text data and associated timing information are copied into a data file, and the text and audio data are then concatenated together and preferably compressed. Finally, the screen slides are converted to images, and the images and concatenated audio and text data are assembled into an executable file, along with additional controlling software.

In another embodiment, the invention is directed to a method of unpackaging and launching an executable file, including providing the executable file including executable code and a plurality of blocks of data, running the executable code to identify one of the blocks, processing identification information in the block to determine the contents of the block, reading the data in the block and creating a corresponding directory if the block is a destination directory block, decompressing the data in the block and writing the decompressed data to an appropriate directory if the block is a compressed file block, writing the data in the block to a temporary directory if the block contains a clean-up program, and saving the information in the block if the information contains auto-start path information.

DESCRIPTION OF THE DRAWINGS

Other features and advantages of the invention will become apparent from a description of the figures, in which.

DETAILED DESCRIPTION OF THE INVENTION

Figure 1:
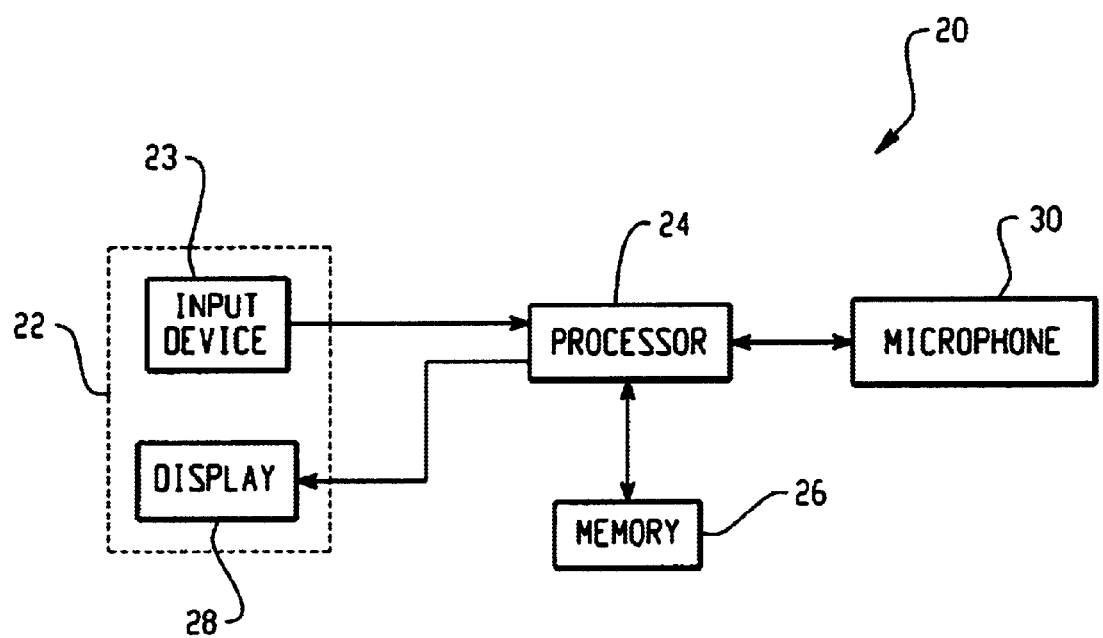
FIG. 1 is a schematic diagram of a system for creating multi-media presentations according to one illustrative embodiment of the present invention.
Figure 2:
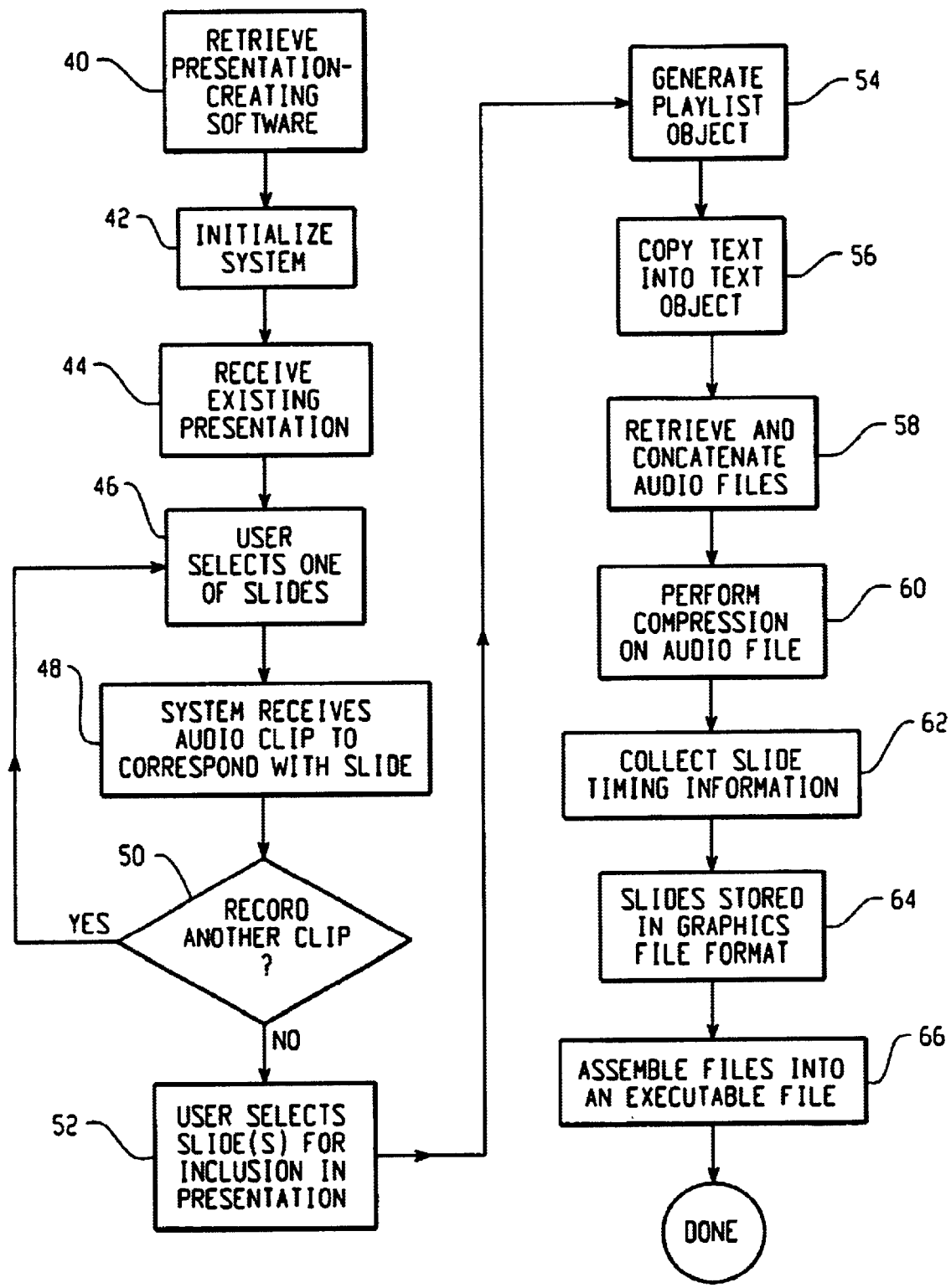
FIG. 2 is a flow chart depicting the operational flow of the system of FIG. 1 during the creation of a presentation.

Referring now to FIGS. 1 and 2, there is shown a system 20 for creating multi-media presentations according to one illustrative embodiment of the present invention. System 20 includes a user interface 22 including an input device 23 and display 28, a processor 24, memory 26, and microphone 30. Memory 26 stores suitable software for creating the multi-media presentations, as is described in more detail below.

Input device 23 of user interface 22 may take any suitable form, such as a keyboard, keypad, mouse, any other input device, or any combination thereof. An author may enter text data through user interface 22, or may use the interface to select appropriate graphical information from a disk storage medium or other source, as is described in more detail below.

Processor 24 is connected to user interface 22, and to memory 26. Processor retrieves the presentation-creating software from memory, receives data and control commands from user interface 22, and displays the presentation information on display 28.

The present invention can be configured to be used, independently, by an end-user or, in the alternative, the invention can be integrated, as an add-in, into another presentation development application. In a preferred embodiment, the system of the present invention is designed for use in conjunction with Microsoft PowerPoint™. It will be understood by those skilled in the art that PowerPoint™ is merely one suitable software program into which the present invention may be incorporated.

Referring now to FIG. 2, an illustrative method according to the invention will be described for modifying and preparing an existing presentation that consists of multiple digital assets in the form of screen slides. Operation begins at step 40, with the processor 24 retrieving the presentation-creating software from memory 26. At step 42, processor initializes the system 20. Preferably, initialization consists of setting microphone 30 as the currently selected recording object and setting the recording level to one that will result in the recording being at a desirable level, such as 50%.

During initialization, processor 24 also preferably resets the size of link sound files. Preferably, processor 24 is programmed to initialize the linked sound files to a relatively large size. In a preferred embodiment, the preset size is 2 megabytes. It will be understood that the file size could be made to be larger or smaller, as necessary.

At step 44, system 20 receives an existing presentation, either from an external source, or from memory 26. The presentation consists of a plurality of screen slides arranged in some predetermined order. In one embodiment, the first screen slide of the presentation is presented on display 28. At step 46, the author selects one of the screen slides, for example, by clicking on suitable icons in a tool bar to scroll through the screen slides, through a drop-down menu, or in any other suitable manner.

Once the author has selected a particular screen slide, operation proceeds to step 48, and processor 24 receives an audio clip to be linked with that screen slide. A suitable icon is preferably displayed on the screen to alert the author that they can begin speaking the desired audio clip, with the microphone 30 capturing the audio and forwarding the audio data on to processor 24. Alternatively, the audio clip can be imported from a file, disk, or the like.

Processor 24 stores the audio data in a suitable temporary file. In addition, processor 24 generates a link between the audio data and the corresponding screen slide, and stores that link, either with the audio clip itself, or in a separate linked file. Alternatively, the audio clip can be stored directly with the screen slide in a slide object, as described in more detail below, thereby obviating the need for any file linking.

In another embodiment, the author can progress through all of the slides sequentially, such as if they were making a live presentation, without the need to use the narration capture interface. The narration would be captured automatically along with the slide advance timings. This embodiment is very useful for creating an archive of a live presentation at the time of the live presentation and as a by-product of the live presentation.

At query block 50, processor 24 determines whether there are additional slides for which an author desires to record audio clips. In one illustrative embodiment, processor may query the author whether they wish to record additional audio clips. If so, operator proceeds back to step 46, and the author selects another slide. Alternatively, processor 24 can display the screen slides sequentially, with the author deciding whether to record an audio clip for a particular screen slide when that screen slide is displayed on display 28.

If, on the other hand, there are no more audio clips to be recorded, then operation proceeds to step 52, and the author selects one or more of the screen slides for assembling into a final presentation, along with a desired compression format to be employed. Such selection of the slides can be done through a drop-down menu, or by scrolling through the various screen slides and selecting the desired slides, or in any other suitable manner. The selection of the compression format can be done via a drop-down or other suitable menu.

Once the author has finished selecting the slides for assembly, operation proceeds to step 54, and processor 24 generates a playlist object corresponding to the selected slides. The playlist object is an intermediate representation of the metadata, and contains the semantic and relationship information for the content, and is a self-contained entity that consists of both data and procedures to manipulate the data. The playlist object includes a media object to store the audio clips, a screen slide object to store the screen images, and a text object to store the text contained in the various screen slides. The media, text, and screen objects also store timing information that defines the temporal relationships between the respective types of data, as is described in more detail below.

Then, at step 56, processor 24 copies the text from the selected screen slides as searchable text data into the text object. The text for each slide may be preceded by an appropriate header or the like so that a link is maintained between the text data and the particular screen slide from which that text data originated. At step 58, the individual audio files from each of the selected screen slides are extracted from the respective slide objects and are concatenated into a single audio file which is stored in the media object. The single audio file is then compressed using the particular compression format previously selected by the author, at seep 60. Thus, by allowing the author to select the compression format and then compressing the audio file after concatenating the individual audio clips together, the author may to some extent control the file size and sound quality.

Alternatively, instead of "physically" concatenating the audio files together as described above, a new file may be created that maintains plural links to the respective audio files. This is an alternate version of concatenation that may be used in connection with the invention.

At step 62, slide timing information from the selected slides is extracted from each slide object, and the information is stored in a suitable file. For example, each screen slide will have timing information relating to the start and stop times that the screen slide is to be displayed, which serves to determine the order in which the screen slides are to be displayed.

Then, at step 64, the selected screen slides are saved in a graphics file format, preferably in Graphics Interchange Format ("GIF") format, and stored in the screen slide object. It will be apparent to those skilled in the art that other suitable graphics file formats may also be used.

At step 66, processor 24 assembles the selected screen slides, in GIF or some other format, with the corresponding audio files, text file, and the file containing the timing information, to create a single compressed, executable file. The process of forming the single executable file is described in greater detail below in connection with FIG. 4. The executable file may then be forwarded to one or more recipients for subsequent viewing of the presentation. For example, the file can be a Windows® 98 or Windows® NT standard executable file, as is well known to those skilled in the art. As is well known, an executable file is a binary file containing a program in machine language that is ready to be executed when the file is selected. In that manner, the executable file may be opened within a suitable web browser or directly in the operating system interface without the need for the presentation software that was used to create the presentation, as is described in greater detail below in connection with FIG. 3.

It will be apparent that the system 20 may be used with appropriate software to create the entire presentation at one time. Thus, rather than retrieving a multi-media presentation, system 20 can present an author with blank templates, into which the desired text and/or graphical data can be entered. Audio clips can then be recorded for one or more of the created slides, either concurrently with the creation of the slide, or after the slides are completed.

Figure 3:
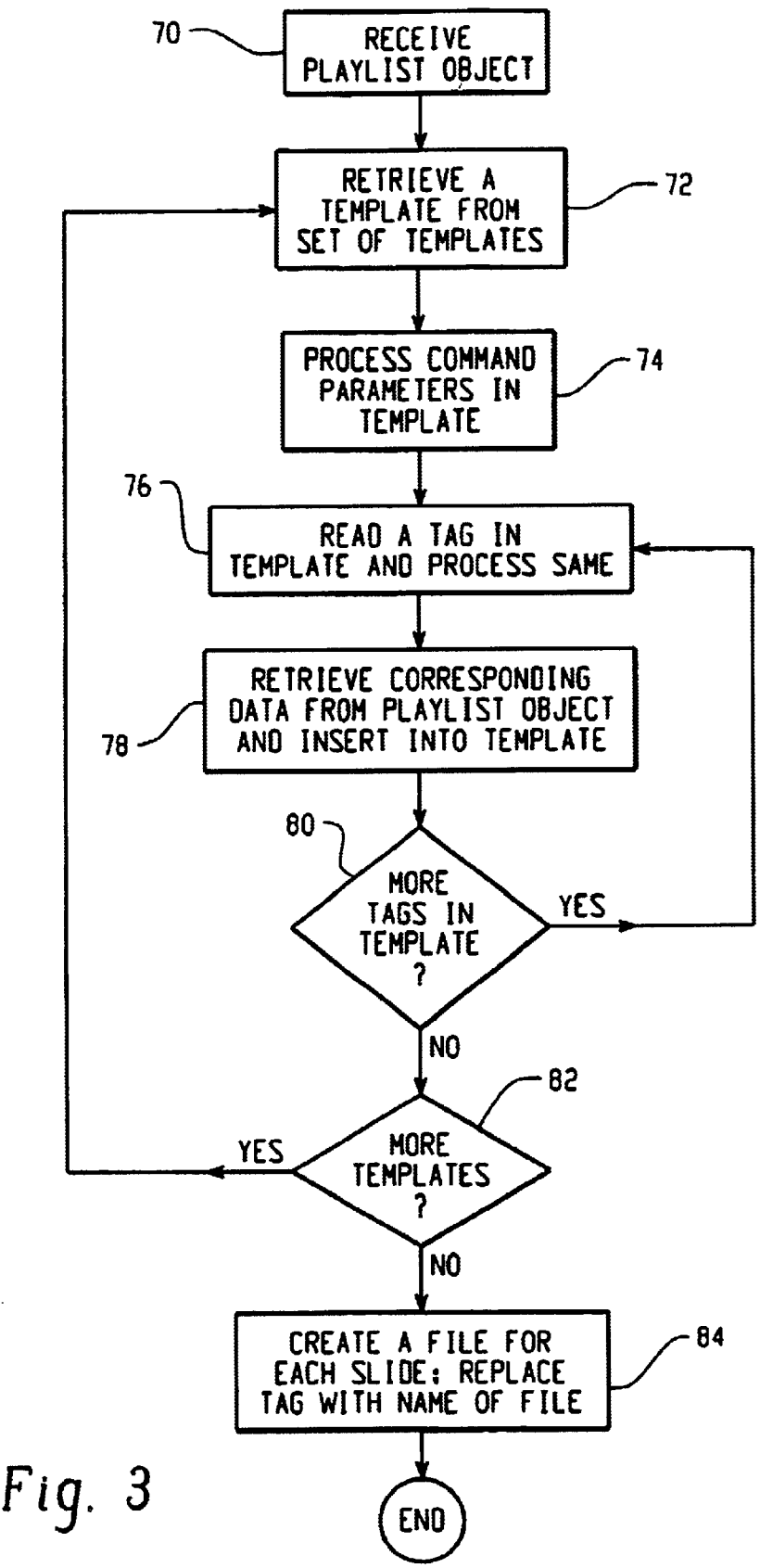
FIG. 3 is a flow chart depicting in detail the exportation of data into a template-based format according to one illustrative embodiment of the invention.

Referring to FIG. 3, an export process that is used to process data contained in the playlist object is described in detail. The export process is designed to transform the data into a template-defined data format suitable for display within a browser. The export process utilizes a plurality of text templates and slide page templates to arrange the meta data from the playlist object such that it is in a browser-suitable format, so that the presentation can be displayed in a browser without the need for the presentation software used to create the presentation. In addition, executable java scripts and applets are generated and inserted into the template, and are run in the browser to allow for the presentation to be displayed in the browser.

The export process begins at step 70, with processor 24 retrieving the playlist object with the slides and clips in temporal order. At step 72, the export process retrieves a template from the set of templates. For example, the template may be a text information file that will contain information describing how the meta data from the playlist object needs to be formatted into a format that is suitable for running in the browser. In addition, the template contains information relating to the layout of the presentation, for example, the relative locations on the display of the slides, table of contents, media player controls, search results, and the like. The template also will contain formatting information, for example, text font, size, color, and similar attributes. Moreover, the template also contains references to other files that are used in the display of the presentation.

At step 74, the export process processes the command parameters contained in the template to determine what type of file it is, and the destination of the completed file. At step 76, the export process reads the first tag in the template. The tag serves as a text replacement holder. For example, the first tag may instruct the export process to process the table of contents information, the text information, or the slide page information. Within the first tag there are a number of subordinate tags (i.e., there is a hierarchy of inner and outer loops of tags). Thus, where the first tag corresponds to the table of contents, there will be multiple entries to be processed, such as the title of each slide. Then, for the first title, there are plural tags in the template to be replaced with corresponding data from the playlist object. For example, the tags may correspond to character font, size, spacing, positioning, and the like. Thus, each tag is replaced by the corresponding information contained in the playlist object. In the case where the template is a text template, processor 24 retrieves the text-related meta data and inserts that information into the template. Likewise, in the case of a slide page template, the corresponding meta data relating to the slide is retrieved and inserted into the appropriate location of the template based on the tags in the template.

Thus, at step 78, based on the particular tag read by the export process, corresponding meta data is retrieved from the playlist object and inserted into the template, along with references to the appropriate files, for example, a slide file or the data file containing the actual text data. At query block 80, the export process determines whether there are additional tags remaining in the template to be replaced with information from the playlist object. If so, operation proceeds back to step 76.

On the other hand, if all of the tags have been replaced for a particular template, operation instead proceeds to query block 82, and the export process determines whether there are additional templates to be processed. If so, operation proceeds back to step 72. If not, operation proceeds to step 84, and the export process searches for .tpl files (i.e, template files). For each .tpl file, the export process creates a new file for each slide and replaces an internal tag with the name of the graphic file. The process then terminates.

Thus, by processing the data using the export process and the template-defined format, the presentation may be viewed in a conventional web browser. Thus, a recipient of the presentation need not have PowerPoint™ software in order to view the presentation.

Figure 4:
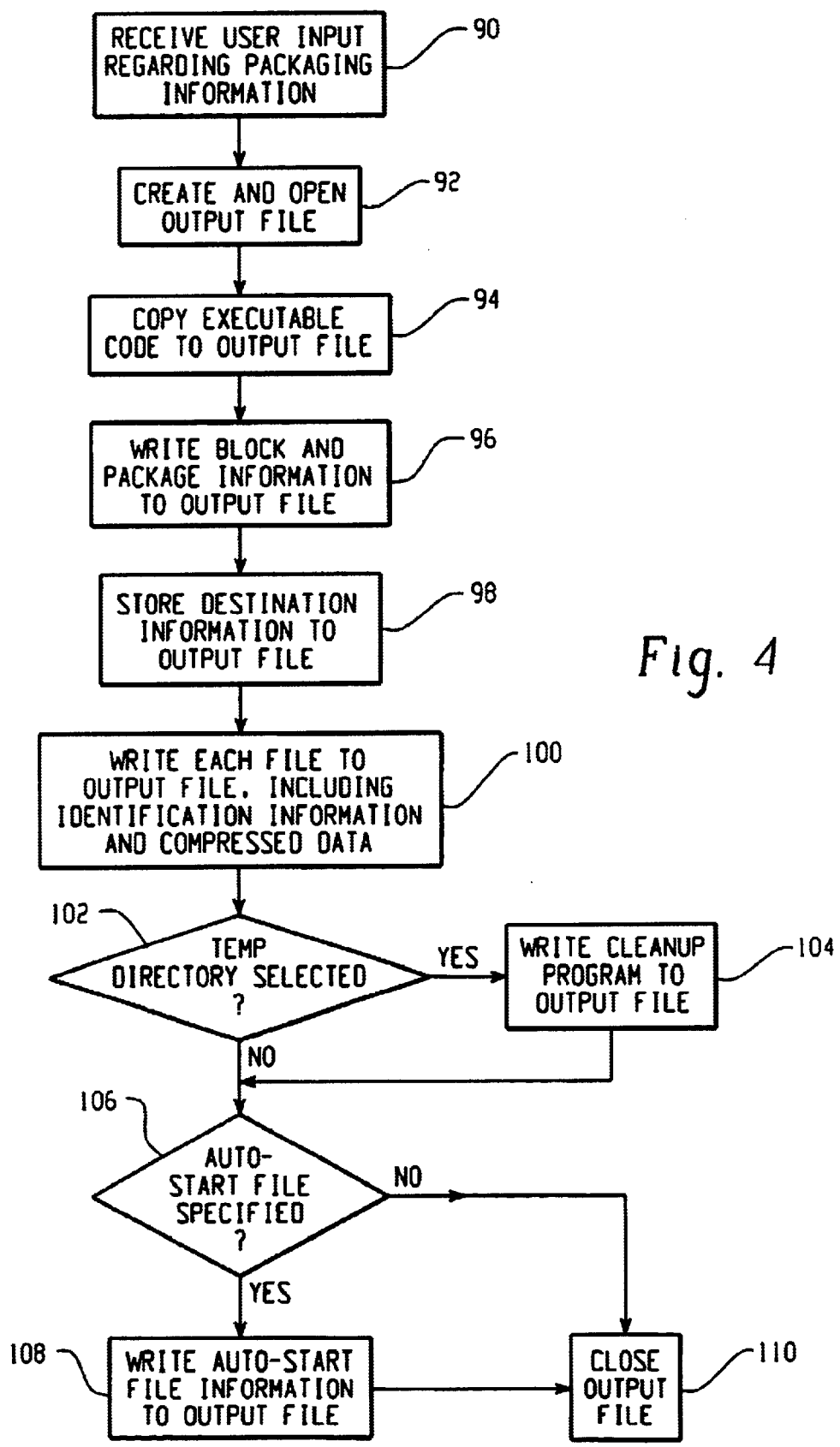
FIG. 4 is a flow chart depicting in detail the assembly of a presentation into a single, executable file according to one illustrative embodiment of the invention.

Referring now to FIG. 4, the process of packaging the files into a single, executable file is described in detail. Operation begins at step 90, with processor 24 receiving input from the author regarding packaging information and preferences. For example, the author is prompted to input an output file name, the name of the directory to be packaged (i.e., where the respective files are currently stored), a directory name where the unpackaged files should be stored, an auto-start file (i.e., the first file to be opened when the executable file is selected), and package identification information to uniquely identify the package and its source or origin. At step 92, processor 24 creates and opens an output file into which the single file will be stored.

At step 94, executable code is copied to the output file. As is well known in the art, the executable code is the code that is run when an executable file is selected. The executable code controls the unpackaging process, as is described in more detail below in connection with FIG. 5.

At step 96, in the event that package identification information was input by the author, corresponding block identification information and package identification information is written to the output file. The information preferably consists of a starting block flag, block identification information, and the package identification information itself.

Operation then proceeds to step 98, and the destination directory information is stored in the output file, along with a starting block flag and block identification information to identify the contents of the block. Following the identification information, a data string (e.g., a 16-bit string) is written to the output file, which indicates the length of the directory information. And finally, the destination directory information itself is written to the output file.

Then, at step 100, each file in the directory to be packaged is sequentially processed and written to the output file as an individual block. As described above, an author will have previously selected a number of the screen slides to be included in the presentation. Processor 24 accesses the playlist object and retrieves the GIF files for the selected slides from the screen slide object, the single concatenated and compressed audio file from the media object, and the data file containing the corresponding text data from the text object. In addition, processor 24 retrieves the file containing the timing information for the selected slides.

At step 100, for each file a starting block flag is written to the output file. File identification information is then stored to identify the file. Next, the string length of the file name is written to the output file, followed by the file name itself. Then, processor 24 determines whether the file is compressed: if not, the file is compressed and stored in a temporary location. Processor 24 next writes information (preferably 32 bits) relating to the size of the compressed file to the output file. Finally, the compressed file is written to the output file, either from the temporary location, or from the originating directory. If a temporary file was created, it is then deleted.

Operation then proceeds to query block 102, and processor 24 determines whether the unpackaging directory is a temporary file. If not, operation proceeds to query block 106. If so, operation instead proceeds to step 104, and a clean-up program is retrieved by processor 24 to be included in the output file. The clean-up program is an executable file upon being expanded, and is operative to delete the files contained in a particular temporary file. In this manner, the expanded files contained within the executable file do not permanently occupy memory on the recipient's machine, unless the presentation is intended to be permanently saved on the recipient's machine, in which case a destination directory other than the temporary directory is selected.

Storage of the clean-up program is as follows: first, a starting block flag and clean-up program identification information are written to the output file. Then, the clean-up program is compressed to a temporary location in memory. The length of the compressed program is written to the output file, followed by the copy of the compressed program. The temporary compressed file is then deleted, and operation proceeds to query block 106.

At query block 106, processor 24 determines whether one of the files in the bundle was designated as an auto-start file. If not, operation terminates at step 110 with the closing of the output file. On the other hand, if one of the files was designated as an auto-start file, then operation instead proceeds to step 108, and starting block flag and auto-start identification information is written to the output file, followed by a 16-bit string to indicate the length of the auto-start string name, which is followed by the auto-start string itself. Operation then terminates at step 110, and the output file is closed.

In an alternative embodiment, the package process inserts a source-identifying block into the package, with such block serving to identify the source of the package. In this manner, the unpackaging process described below can verify the source of the package to ensure that the package does not contain any potentially harmful or offensive data.

Figure 5:
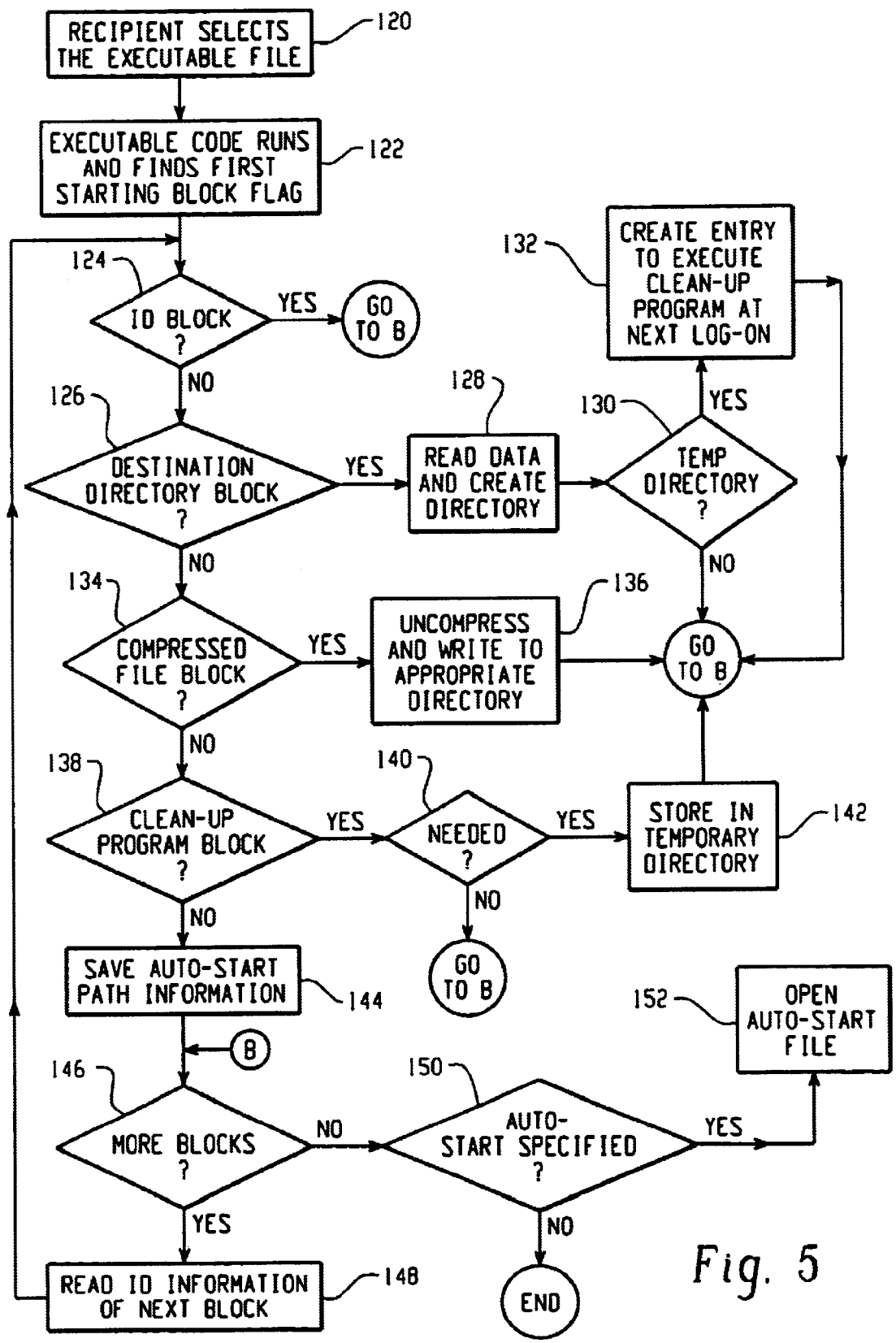
FIG. 5 is a flow chart depicting the operational flow of an unpackaging process according to one illustrative embodiment of the invention.

Referring now to FIG. 5, the unpackaging of the packaged presentation is described in more detail. As is described above, a presentation is packaged into a single, executable file. The executable file may then be transferred to one or more recipients in various ways, either as an email attachment over a communications network, on a disk, or in any other suitable manner.

In another embodiment, the executable file is transferred to a host web site, where the file is unpackaged as described below and made available to recipients over the Internet or some other communication network. In that situation, the recipient need not unpack the presentation on their desktop; rather, the unpackaged presentation may be streamed to the recipient slide-by-slide on an on-demand basis.

In the case where the executable file is delivered directly to the recipient, operation begins at step 120, with the recipient selecting the executable file, for example, by double clicking on an appropriate icon on the recipient's display. Once the recipient selects the executable file, operation proceeds to step 122, and the executable code in the file automatically runs and scans the data in the output file until it encounters the first starting block flag. Next, the executable code determines the identity of the data contained in the first block, by reviewing the identification information stored in the block during the packaging process.

At query block 124, if the block is determined to be the package identification block, then operation proceeds directly to query block 146 to scan the data for the next block in the file. The package identification block is not processed by the executable code during the unpackaging process. If the block is determined to not be the package identification block, then operation proceeds to query block 126, and the executable code determines whether the block contains unpackaging directory information. If so, then operation proceeds to step 128, and the executable code reads the information contained in the block to determine the full path name of the output directory and subdirectories in which to store the files expanded during the unpackaging process. The code then creates all of the necessary directories and subdirectories into which the expanded files will be stored. Operation then proceeds to query block 130, and the executable code determines whether the directory into which the files will be saved is a temporary directory. If not, operation proceeds to query block 146. If in fact the directory is a temporary directory, then operation proceeds to step 132, and a registry entry is created to control the clean-up program to be executed the next time the recipient logs in to their machine. Operation then proceeds to query block 146.

If at query block 126 the data block is determined to not be a directory information block, then operation proceeds to query block 134, and the executable code determines whether the block is a compressed file block. If it is, then operation proceeds to step 136, and the file name for that file is read from the block and concatenated with the destination directory. The executable code then determines whether a corresponding subdirectory exists and, if not, the subdirectory is created and opened. The length of the compressed file is determined, and if the data needs to be decompressed, it is decompressed and written to the destination directory. Operation then proceeds to query block 146.

If at query block. 134 the block is determined to not be a compressed file, then at query block 138 the code determines whether the block contains the clean-up program. If so, operation proceeds to query block 140, and it is then determined whether the clean-up program is needed or not, by checking the machine's temporary directory to determine whether a copy of the program is already resident on the machine. If so, operation proceeds to query block 146. On the other hand, if there is no resident copy of the program, operation instead proceeds to step 142, and the clean-up program is decompressed to an executable file in a temporary directory, such as the Windows temporary directory. Operation then proceeds to query block 146.

If the block does not contain the clean-up program, then operation proceeds to step 144, and the executable code determines that the block contains the auto-start file information, and the code saves the path information of the auto-start file for future use. Operation then proceeds to query block 146.

At query block 146, the executable code determines whether there are additional blocks to be unpackaged. If so, the code reads the identification information of the next block at step 148, and operation then proceeds back to query block 124 to determine the block type.

If at query block 146 it is determined that there are no more blocks to be unpackaged, then operation proceeds to query block 150, and the code determines whether there is a file designated as the auto-start file, by checking for auto-start path information. If there is an auto-start file, then operation proceeds to step 152, and the corresponding file is opened to begin the presentation.

Where the packaged presentation is transferred to an ASP host, the host is programmed to override the auto-start data and the destination directory information. The host preferably includes codes that investigate the package identification information to ensure that the executable file was generated by a known, trusted source, and not by some unknown entity that might be transmitting a virus or other undesirable content. Once the identity of the author is verified, the package is then unpackaged to a destination directory as determined by the host, and the host stores the presentation until a user accesses the host and requests the presentation. The host can then stream the presentation to the user in any suitable, well known manner as described above.

Figure 6:
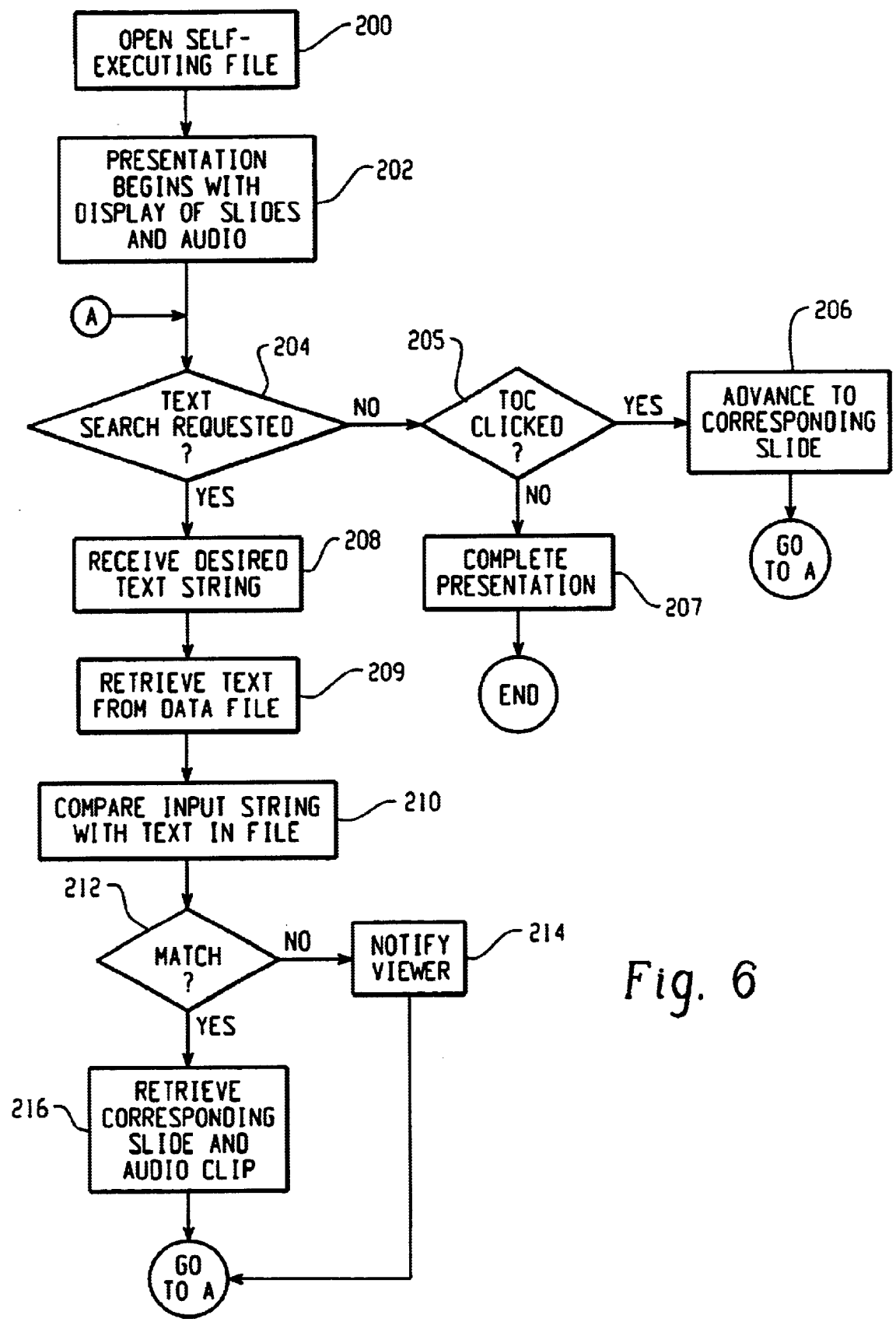
FIG. 6 is a flow chart depicting the operational flow during playback of a presentation created according to the system of FIG. 1.

Referring now to FIG. 6, playback of the created presentation is described in more detail. Initially, the presentation is obtained by an intended recipient, either on a disk or other storage medium, as an email attachment, or transferred over a computer network, such as over the Internet. Then, at step 200, the recipient opens the file by clicking on a suitable icon representing the presentation, or in any other well-known manner. As described above, when the bundle is extracted by the recipient opening the self-executing file, one of the sub-files is designated as the initial file to be opened, as in conventional in self-executing files. In addition, the extracted files are written to the appropriate destinations for subsequent retrieval during the presentation.

Figure 13:
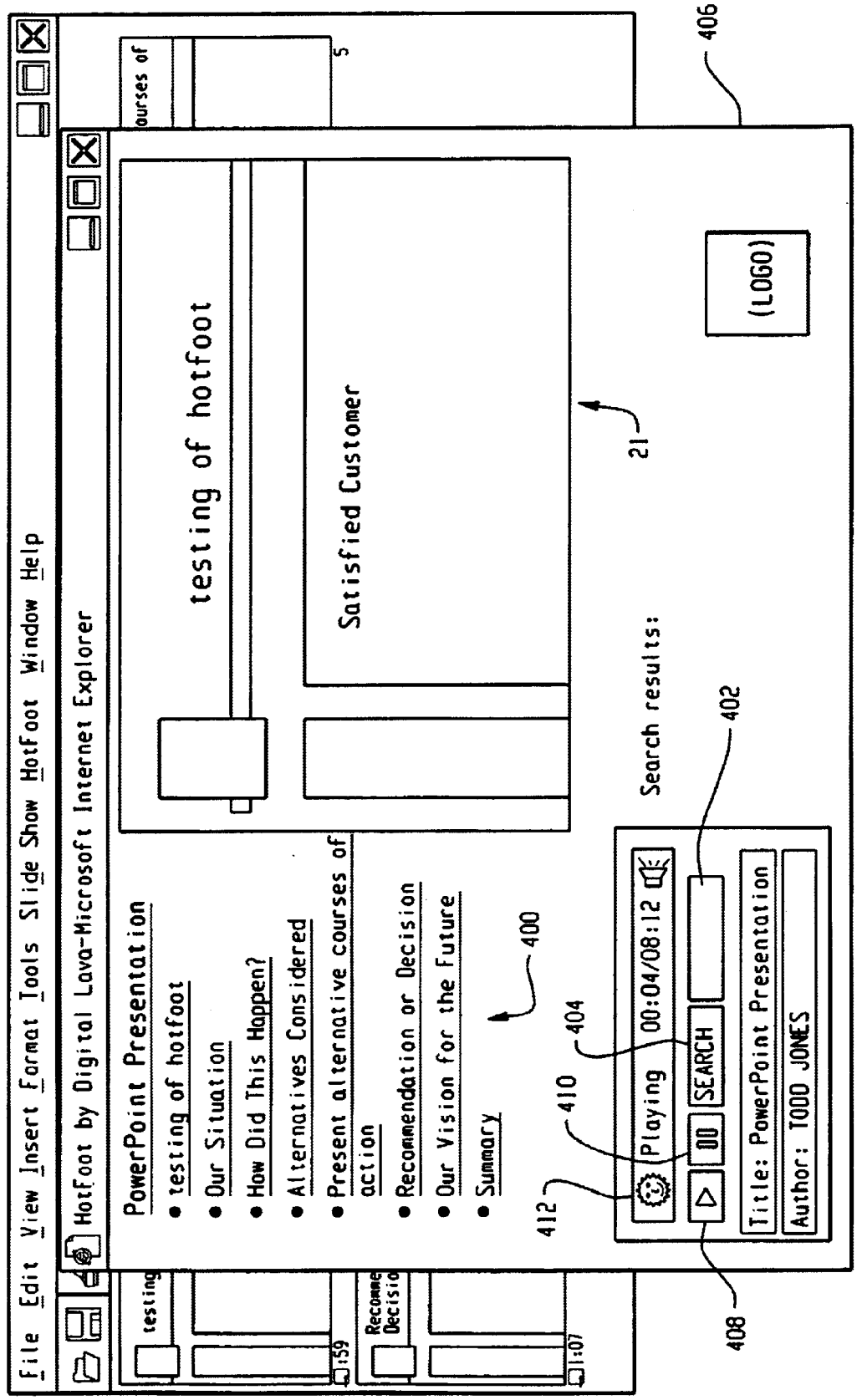

At step 202, the presentation is displayed to the recipient, with the slides being sequentially displayed along with any corresponding audio clips for the respective slides. In addition, a table of contents is displayed on the display, and includes the title of each slide in the presentation (FIG. 13). The titles may be selected by the recipient to advance the presentation to the corresponding slide. At query block 204, the recipient's machine (hereinafter "the machine") determines whether the recipient has requested a search for a particular text string within the presentation. In one embodiment, such a request is made by entering the text string in an appropriate box on the screen and then clicking on a corresponding button on the screen (see FIG. 13). If the recipient does not request a search for text, then operation proceeds to query block 205, and the machine determines whether the recipient has made a selection of one of the slide titles in the table of contents. If so, the presentation is advanced to the selected slide, and that slide is displayed along with the corresponding portion of the concatenated audio file, at step 206. A time-based index into the concatenated audio file is provided, and instructions are transmitted to reposition an audio player to the appropriate point in the audio file based on the time-based relationship between the slide and the audio file. Operation then proceeds back to query block 204. If the recipient does not select any of the titles in the table of contents, then operation instead proceeds to step 207, and the presentation continues to completion, and operation then terminates.

If, on the other hand, the recipient makes a request for a text search, operation proceeds to step 208, and the recipient enters their text string, which is received by system 20. At step 209, the machine accesses the meta data file that was included in the self-executing file and that contains all of the meta data information necessary for playback, including the text that appears on the individual slides. At step 210, the machine compares the text string with the text contained in the data file. At query block 212, the machine determines whether a match exists. If not, then at step 214 the recipient is notified that there is no match for the entered text string. Operation then proceeds back to step 204, and the recipient may enter another text string to be searched.

If there is a match between the text string and the text in the data file, operation proceeds to step 216, and the machine retrieves the appropriate GIF file and determines the corresponding position within the single audio file and presents the screen slide and corresponding portion of the audio file to the recipient. There are many well-known ways in which system may determine the appropriate GIF file to retrieve.

For example, an association table may be maintained to link the text of each slide with a corresponding GIF file.

It will be apparent that a recipient may request that a search be conducted before the presentation begins, during the presentation, or after the presentation is completed.

Once the slide and corresponding portion of the audio file are presented to the recipient, the presentation may be continued, sequentially from the selected slide to the end of the presentation, operation may terminate, or operation may proceed back to query block 204 to allow the recipient to search for another text string.

Figure 7:
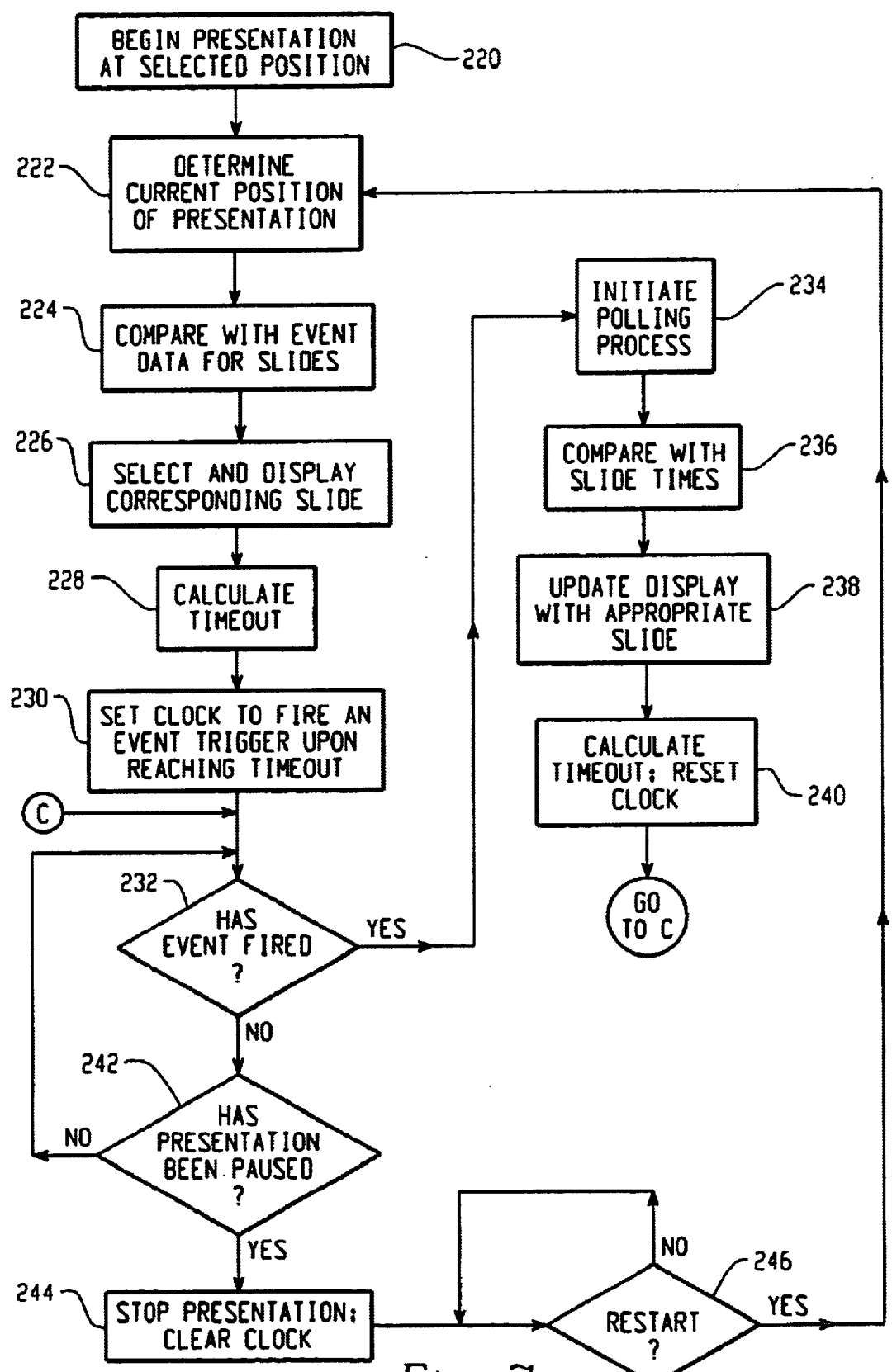
FIG. 7 is a flow chart of an event handling process according to one illustrative embodiment of the invention.

Referring to FIG. 7, the operational flow of event handling software included in one illustrative embodiment of the invention is shown in detail. The event handling software controls the navigation through a presentation at the recipient's machine. The software relies on a set of event data that contains all of the information relating to the timing of the presentation. For example, the event data includes information concerning the start and stop times of each slide page, of each of the clips in a clip list, and of each audio clip. In addition, the event data may include information concerning when the presentation should automatically pause or skip to a new position.

Operation of the event handling software begins at step 220, and the presentation begins, for example, when the self-executing file is opened. The presentation then begins to be displayed, for example, at the beginning of the presentation. At step 222, the recipient's machine is controlled by the event handling software to determine the time of the current position of the presentation. For example, when the presentation is launched from the beginning, the software determines that the time is either at time zero or only a few milliseconds. At step 224, the time is compared with the event data for the respective slides, and the slide whose time is either equal to or less than the determined time is selected and displayed in the slide window on the recipient's machine, at step 226.

At step 228, the event handler software calculates a timeout based on the current time of the presentation and the stop time of the slide being displayed. At step 230, the event handler sets a clock to fire an event trigger upon reaching the timeout.

At query block 232, the event handler determines whether the event trigger has fired. If so, then operation proceeds to step 234, and the event trigger initiates a polling process to repeatedly (e.g., every 200 milliseconds) determine the current position of the presentation. At step 236, the current position is compared with the event data for the respective slides. At step 238, the slide whose time is 1) equal to or 2) less than, and closest in time to, the current time is selected and the slide window is updated with the selected slide. At step 240, the event handler calculates a timeout based on the current time and the stop time of the slide, and resets the clock to fire an event trigger upon reaching the new timeout. Operation then proceeds back to query block 232.

On the other hand, if at query block 232 it is determined that the event trigger has not yet fired, operation instead proceeds to query block 242, and the event handler determines whether the presentation has been either paused or stopped by the recipient, for example, by clicking on a pause or stop button, or by selecting another slide for presentation. If not, operation loops back to query block 232. If the presentation has been paused or stopped, then operation proceeds to step 244, and the presentation is stopped. Also, the event trigger clock is cleared. Operation then proceeds to query block 246, and the event handler determines whether the presentation has been restarted, for example, by the recipient pressing a start button, or repressing the pause button. If the presentation has been restarted, operation proceeds back to step 222 to determine the time of the new position of the presentation.

It will be understood that when the recipient selects a new slide for display, the presentation is automatically restarted at step 246, and operation then proceeds back to step 222.

The above description of the event handler deals primarily with the screen slides themselves. However, it will be apparent to those skilled in the art that the event handler would perform the same functions for synchronizing the display of textual information, audio clips, and the like.

Figure 8:
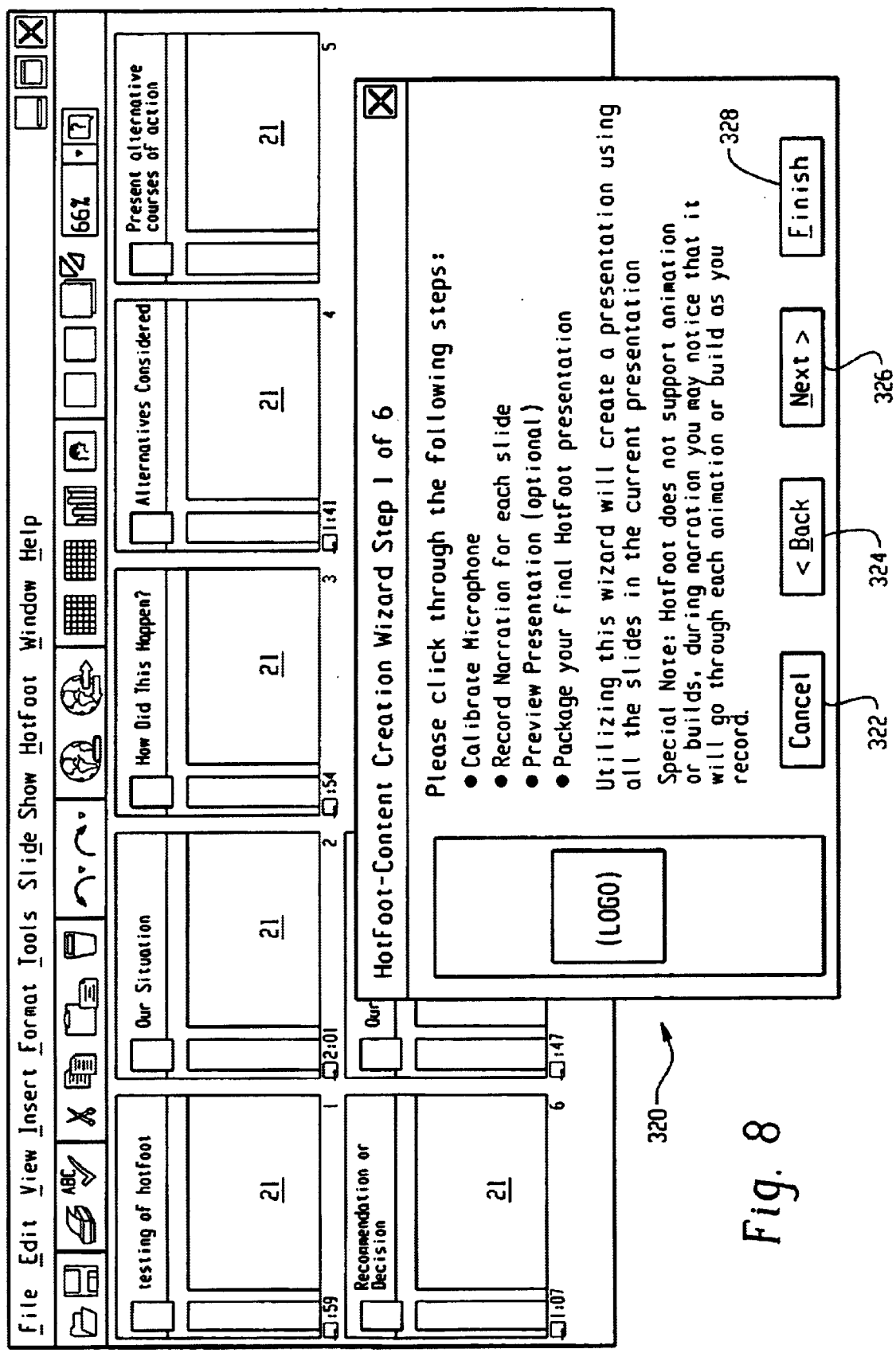
FIGS. 8 through 13 are screen shots during creation of a multi-media presentation.

Referring now to FIGS. 8 through 13, there is shown one illustrative embodiment of various interface screens generated by system 20 to facilitate creation of a multi-media presentation by an author. As shown in FIG. 8, system 20 preferably displays each of the generated screen slides 21 with the accompanying text for each. In addition, a user interface window 320 is provided to guide an author through the process of creating a multi-media presentation. The user interface navigates the author through the steps of initializing the system 20, recording narration for the respective slides 21, previewing a presentation, and packaging the final presentation. The user interface 320 includes a Cancel button 322, a Back button 324, a Next button 326, and a Finish button 328 to allow the author to control navigation through the process.

Figure 9:
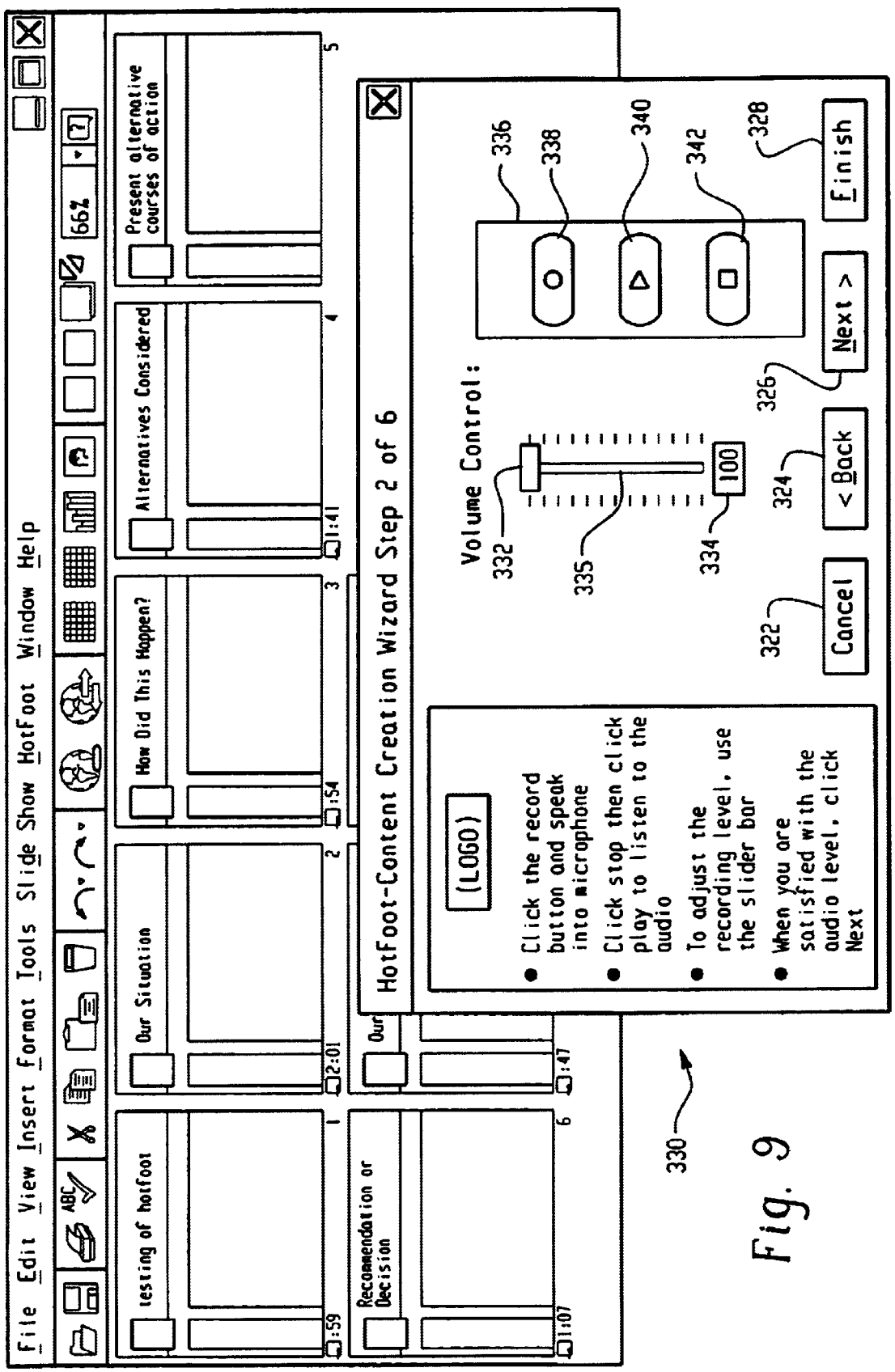

FIG. 9 shows a user interface 330 which may be used by an author to calibrate the microphone. The calibration of the microphone is performed by providing a volume control 332 that can be manipulated by the author to adjust the volume of the microphone. The range of control spans from 0 to 100%. The screen preferably displays the control level at which the microphone is set in a display window 334. The level can be increased and decreased by manipulating a slide bar 335. To test the volume level to determine whether it is acceptable, a control panel 336 is provided that enables the author to record and then play back a test clip to determine if the volume level of the microphone is acceptable. Control panel 336 preferably has a record button 338, play button 340 and stop button 342. To test the microphone, the author clicks the record button 338 and speaks into the microphone. When the author is finished recording, the stop button 342 is pressed. The author can listen to the recording by clicking the play button 340. When the volume level has been set to a desirable level, the author can click the NEXT button 326 to continue with the creation of a presentation. If, at any time, the author wants to return to a previous window to change a setting, the author can do so by clicking the BACK button 324.

Figure 10:
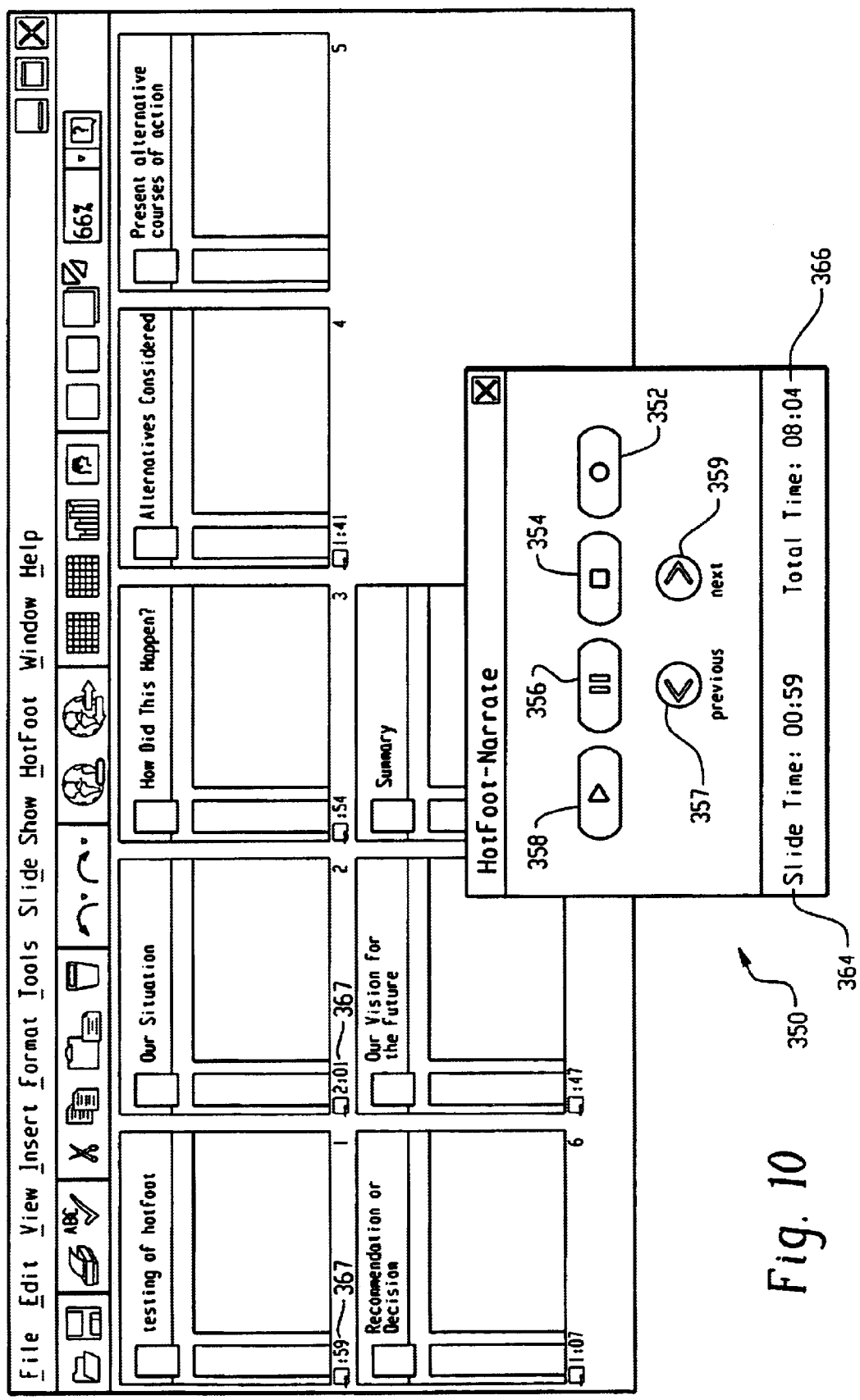

FIG. 10 illustrates a user interface 350 that assists the author in narrating a slide. To begin recording on a particular slide, RECORD button 352 is clicked. The author can stop the recording at anytime by clicking on STOP button 354. The author can also pause the recording by pressing PAUSE button 356. The author can play back the recording by clicking on PLAY button 358 to ensure that the audio clip is audible and clear. If the content is not as desired, the author can override the previous audio clip by recording over it. In addition, interface 350 includes Previous and Next Slide Buttons 357 and 359, which allow the author to navigate through the respective slides 21. Thus, the present system allows the author to record the slides out of order, giving the author greater independence in working on the slides in the order desired by the author and, not necessarily, in the order that the slides appear in the presentation material.

When finished narrating a slide, the author can proceed to the next slide by clicking on NEXT slide button 359, or to a previous slide by clicking on PREVIOUS slide button 357. The activation of either of those buttons will automatically terminate the narration for that slide. Thus, it will be apparent that user interface 350 allows the author to record narration for the respective slides in any order. The audio for each slide is independent of the other slides, and thus, the audio for the slides can be recorded in an order independent of the order of the slides.

The interface 350 preferably includes a slide time meter 364 that displays the length of the audio for each slide and a total time meter 366 that displays the length of the audio for the entire presentation. This allows the author to keep track of the length of the entire presentation as the author is recording the audio for each slide.

In addition to providing information regarding the length of the audio recordings on interface 350, the length of the various audio recordings are also provided as time meter displays 367 under each slide. This enables the author to view the audio recording length for all of the slides simultaneously.

In one embodiment, system 20 requires that narration be recorded for each slide, with the length of the recording determining the length of time for which the slide will be displayed. Alternatively, if narration is not recorded for a particular slide or slides, a default display time may be assigned to that slide, such as 4 seconds or some other amount of time. Or, system 20 may query the author to enter a default time for a particular slide for which no narration has been recorded.

Figure 11:
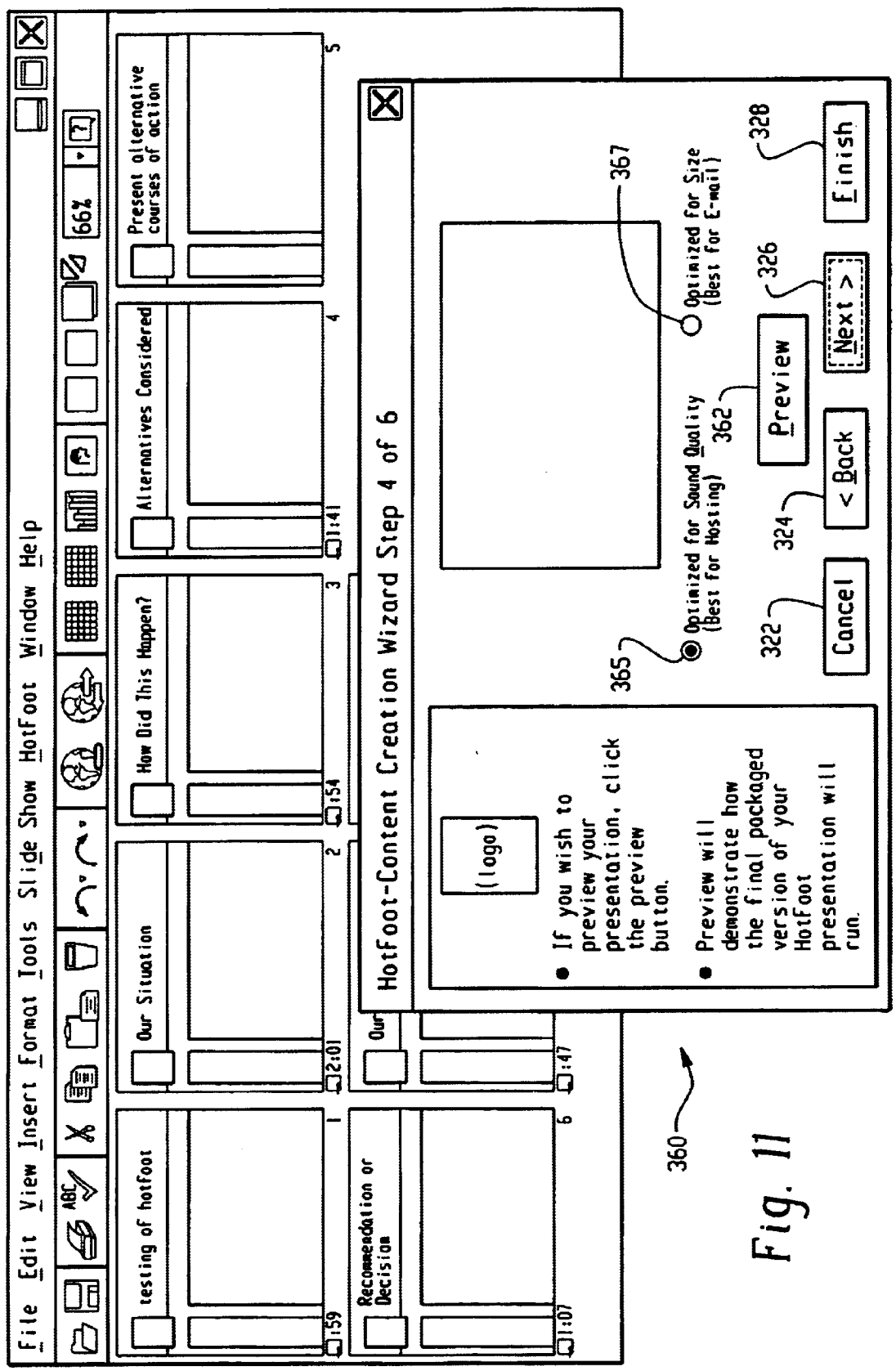

FIG. 11 shows a user interface 360 that allows an author to preview and/or package a finished presentation. Interface 360 includes a Preview button 362, which if clicked causes system 20 to launch the presentation immediately, so as to allow the author to preview the presentation before completion. The presentation material can be packaged so as to be optimized for sound quality or optimized for size. The author makes their selection by clicking on one of two windows 365 and 367. Clicking on the preview button causes the processor 24 to carry out the concatenating, compressing, and export processes so as to have the data in a format suitable for presentation within the web browser. In addition, the preview function causes the processor to launch the auto-start file in the web browser automatically, as would be done by the unpackaging process described above.

Figure 12:
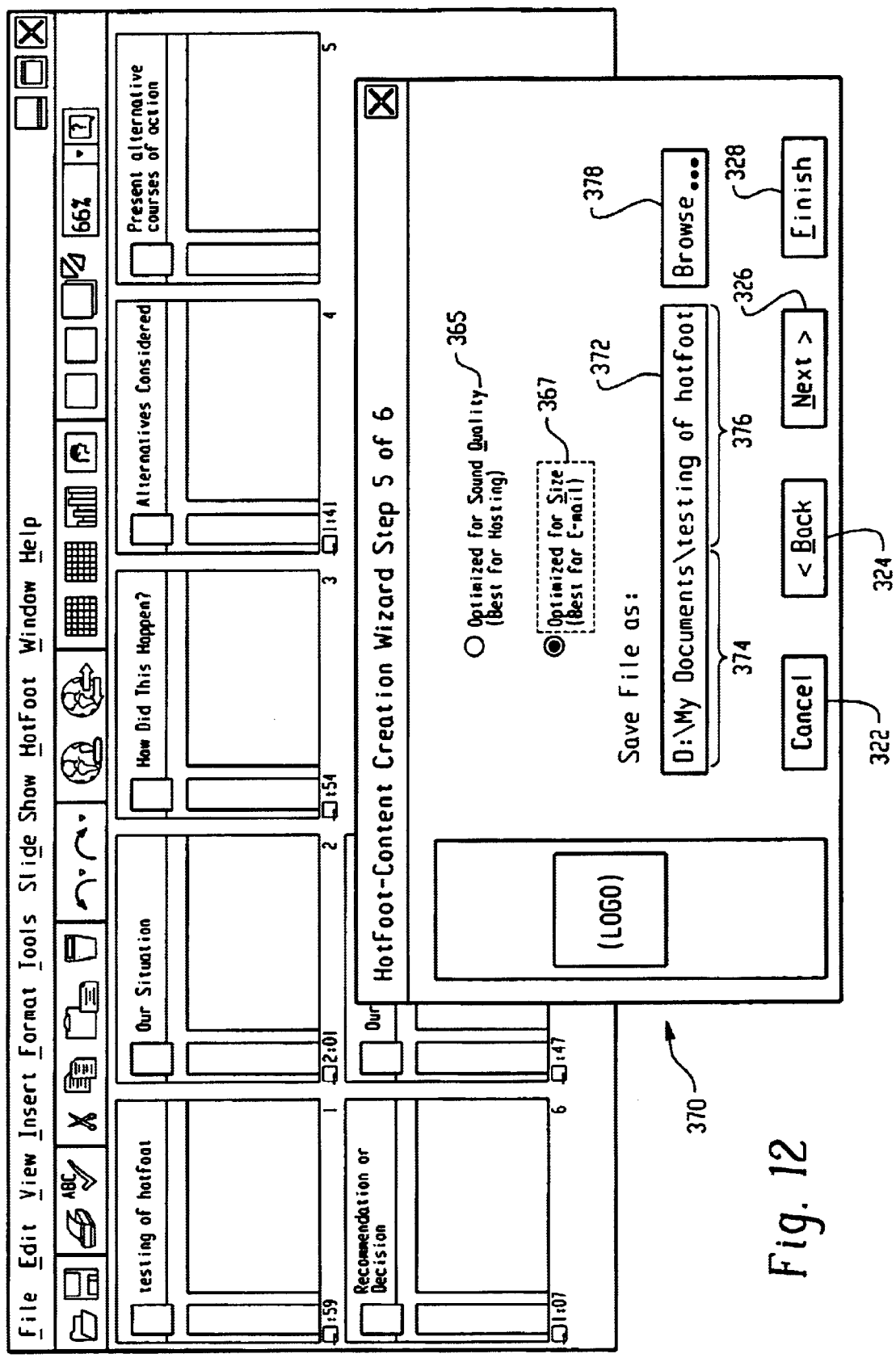

FIG. 12 depicts a user interface 370 to allow the author to select a file name under which the presentation will be stored. In a preferred embodiment, optimizing the presentation for size provides a compression of about 6500 bits per second, whereas optimizing for sound quality provides a compression of about 8500 bits per second. In the embodiment shown in FIGS. 9 and 10, the user interfaces 360 and 370 only allow the author two choices for optimization, namely, optimization for sound quality and optimization for size. The system, however, can be adapted to provide additional optimization choices to the author. For instance, if authors desire a different level of audio, e.g., audio at a high bandwidth to facilitate high quality CD recording, the system can be adapted to provide additional optimization choices to the author. The optimization for sound quality and size are preferable for presentation materials that mainly contain audio consisting of the spoken word. In the case of audio containing spoken word, the frequency response is small and telephone-like, monaural quality is the audio level that is required to be provided by the system.

User interface 370 assists the author in saving the presentation material. In one illustrative embodiment, system 20 keeps track of the last used directory 374 and displays the directory name in the "save file as" window 372. That directory is concatenated with the current name 376 of the presentation material to create the file name for the presentation. For instance, user interface 370 displays a directory of "D:\MyDocuments\" and a file name of "testing of hotfoot.exe." The presentation material is thus saved in the specified directory under the specified file name. User interface also includes a Browse button 378 to allow an author to select another path in which to store the presentation. In yet another embodiment, system 20 inserts a default directory into window 372, rather than the last-used directory.

As is described above, the creation of the playlist object allows the system of the present invention to be compatible with numerous other applications because the playlist object simplifies, generalizes, and abstracts the process of data storage, post-processing, and transmission. Thus, the playlist can be reused in other applications, while the playlist ensures the referential integrity, provides object modeling, provides consistency between what is done in the present system with other applications, which allows efficient and compatible data sharing between different applications.

The system loops through each slide, extracts the text of the slide, and removes the megaphone object from each slide and exports it as a .gif file. The exportation of the slide object as a .gif file can be done by using Microsoft PowerPoint™. Auto-numbering is automatically turned off by the system so as not to get a "1" at the bottom of each page. The duration of the audio file for each file is measured and, if the slide has no audio duration, a duration of four seconds is assigned. The reason for assigning a four second duration is that the recipient's application is responsible for advancing the slides. If there is no audio recorded for the slide, the slide will be shown for four seconds and then is automatically advanced to the next slide.

The corresponding audio clips for the selected slides are also retrieved and saved as .wav files. The .wav files are concatenated and integrated together. The .wav files can also be converted to other digital media continuous stream formats, such as MP3. It will be apparent to those skilled in the art that by concatenating the files together, prior to encoding into another digital sound format, the notion of independent audio linked to slides is transformed into a coherent and unchangeable presentation format. The coherent format allows the recipient to jump from slide to slide randomly and out of order but does not allow the recipient to modify or change the audio or the slides. Therefore, the intention of the publisher is preserved.

In one illustrative embodiment, the .wav file is converted to a Windows Media file and the bit rate is set to the bit rate previously determined by choosing optimization for size or sound quality. The Windows Media file is a single media file that can be attached to the playlist object.

The author has the option of choosing which slides will be included in the presentation package, with such selections being done in any suitable manner, such as by clicking on a window next to each slide, through a drop-down menu, or in any other suitable manner. For instance, the author can chose slides 1, 3 and 7 and those become packaged in the presentation. Or the author can unselect 3 and select another slide, for instance slide 8. The fact that the audio is tied to a slide, as opposed to across the entire presentation, allows the author to chose the order and the slides to be included in the presentation. System 20 extracts the necessary information from the selected slides only when packaging the presentation.

The packaged presentation is then subjected to the above-described export process, in which the necessary information is extracted from the playlist object and put into a template-defined format suitable for display within a browser. In one embodiment, system 20 stores the title of each slide in a suitable file for creating the table of contents, and strips all of the text from each slide and stores the text in another file, as is described above. The information proceeds to the packaging process which, as described in detail above, takes the files and subdirectories, including the media file and the slides, and creates an executable file.

The packaging process gathers a relatively large number of files, for example as many as 30 to 40 individual files, that are created by system 20 when a slide presentation is created. There may also be other files, such as external files, that also need to be included in a presentation. The packaging process gathers the external files along with the presentation files and creates a single, simplified package. In a preferred embodiment, the packaging and unpackaging functions are completed without interfacing with the author. One of the files in the package is designated as the file to be opened when the package is extracted. A marker is also placed in the executable file that identifies the file as one that is compatible with the application of the present system.

Referring now to FIG. 13, there is shown a portion of the presentation, for example when an author has selected the Preview option. The presentation includes a table of contents 400 that includes the title for each of the slides. Each title may be clicked on to immediately display the corresponding slide. In addition, the presentation displays one of the slides 21. Moreover, the presentation includes a window 402 into which the recipient may enter a text string to be searched for. A Search button 404 is provided and may be selected by the recipient to begin a search for text, as is described above in more detail. The search results are displayed in a portion of the screen 406. In one embodiment, if there is a match, the slide that contains the matched text is automatically retrieved and displayed, along with the corresponding audio clip. Alternatively, the results may be displayed for the recipient, with the recipient then selecting one of the slides for display. The display preferably also includes a Play button 408, Pause button 410, and running indicator bar 412 to indicate the current state of the presentation.

While the above description has focused primarily on a presentation consisting of screen slides and corresponding audio, it will be readily understood by those having ordinary skill in the art that the various aspects of the present invention have utility in connection with other data-presenting formats. For example, the present invention may be used to export, package, unpackage, and display presentations consisting of spread sheets and corresponding audio clips for one or more of the respective cells in the spread sheet, word processing documents with corresponding audio clips for the various pages of the document, charts, screen capture scenarios, and the like. It will be understood that the various aspects of the invention, including the packaging process, export process, unpackaging process, and event handling process, have utility in connection with various different types of information, and that the screen slide presentation described herein is but one illustrative embodiment of the utility of the invention. Thus, the export process, packaging process, unpackaging process, and event handling process can each be used in connection with various types of information.

By way of example, in the case of a spreadsheet, the present invention may be used to add audio clips (e.g., voice comments) to particular cells within the spreadsheet, in a similar manner to the audio clips being associated with the respective screen slides. The invention will concatenate the audio clips into a file, compress the file, and assemble the compressed file, spreadsheet graphics file, and the other files described above into a single, executable file.

In addition, a word processing document can be associated with one or more audio clips, wherein the audio clips are linked to particular pages, chapters, paragraphs, and the like, of the document. The export process, packaging process, and unpackaging process are carried out in much the same way as in the case of the screen slide presentation.

As used herein, the term "digital asset" is defined as a collection of data that is presented to a viewer, such as a screen slide, a video clip, an audio clip, a spreadsheet, a word processing document, and the like.

As described above, in the case of a presentation consisting of plural screen slides, the text from each screen slide is preferably extracted and stored in a data file, with such data being available for searching during subsequent presentation. Where the invention is dealing with other types of digital assets, some other type of data may be extracted from the respective assets for use in intelligently navigating through the presentation. For example, in the case of a video signal, closed captioning information may be extracted from the video and stored in the data file. Alternatively, selected video frames may be extracted and stored, such as transitory frames or other important frames. Moreover, in the case of audio data, key words may be extracted from the audio and stored in the data file.

In addition, while the above description focuses primarily on audio clips being linked to respective digital assets (e.g., screen slides, video clips, and the like), the audio clips can be replaced with any continuous stream media format, such as video, audio and video, animations, telemetry, and the like. Thus, the invention has utility with any continuous stream media format, and it will be understood by those skilled in the art that audio clips are but one example thereof.

From the foregoing, it will be apparent to those skilled in the art that the system and method of the present invention provide for creating a multi-media presentation in a user-friendly, efficient manner. The system also provides a presentation that can be searched to arrive at desired subject matter.

While the above description contains many specific features of the invention, these should not be construed as limitations on the scope of the invention, but rather as exemplary embodiments thereof. Many other variations are possible. Accordingly, the scope of the invention should be determined not by the embodiments illustrated, but by the appended claims and their legal equivalents.

What is claimed is:

1. A method of processing data, comprising:

receiving plural sets of data corresponding to respective digital assets;

receiving continuous stream media data for one or more of the digital assets;

processing the sets of data to extract particular information from the data, and writing the extracted information to a data file;

compressing the continuous stream media data; and assembling the digital assets, compressed data, and the data in the data file into an executable file;

wherein assembling the digital assets, compressed data, and the data in the data file into an executable file comprises:

creating a single output file;
copying executable code to the output file;
writing destination information to the output file to designate the destination directory of the executable file;
writing plural blocks of data to the output file, each block containing identification information and corresponding data;
writing a block containing a clean-up program to the output file if the destination information corresponds to a temporary file; and
writing auto-start file information to the output file to designate a file to be opened when the output file is executed, if an auto-start file is specified by an author.

2. The method of claim 1, further including designating one of the files to be opened when the executable file is extracted.

3. The method of claim 1, further comprising collecting timing information from the respective assets, and wherein assembling includes assembling the timing information.

4. The method of claim 1, wherein receiving the data comprises receiving the data from a disk.

5. The method of claim 1, wherein receiving the data comprises receiving the data from an author.

6. The method of claim 1, wherein receiving the data comprises receiving the data over a communication network.

7. The method of claim 1, wherein compressing the data comprises compressing the data using a compression format selected by an author.

8. The method of claim 1, wherein receiving plural sets of data comprises receiving data for insertion into respective screen slides.

9. The method of claim 1, wherein receiving plural sets of data comprises receiving data for insertion into a spread sheet.

10. The method of claim 1, wherein receiving plural sets of data comprises receiving plural video clips.

11. The method of claim 10, wherein processing the data comprises extracting frames from the video clips.

12. The method of claim 10, wherein processing the data comprises extracting closed captioning information from the video clips.

13. The method of claim 1, wherein receiving continuous stream media clips comprises receiving audio clips.

14. The method of claim 13, wherein processing the data comprises extracting key words from the audio clips.

15. The method of claim 1, wherein receiving continuous stream media clips comprises receiving video clips.

16. The method of claim 1, wherein receiving continuous stream media clips comprises receiving clips of animation.

17. The method of claim 1, wherein receiving continuous stream media clips comprises receiving audio and video clips.

18. The method of claim 1, wherein receiving continuous stream media clips comprises receiving telemetry clips.

19. The method of claim 1, wherein processing the data comprises copying text into a data file.

20. The method of claim 19, wherein copying the text comprises initially copying the text to a text object.

21. The method of claim 1, wherein writing plural blocks comprises writing the corresponding data in a compressed format.

22. The method of claim 1, wherein writing the blocks comprises writing a block start flag for each block.

23. The method of claim 1, further including receiving user input to identify the destination directory.

24. The method of claim 1, further including writing a source-identifying block to the output file to indicate the source of the file.

25. The method of claim 1, further comprising:
(a) providing plural templates, each having command parameters and plural tags, wherein the tags include instructions for insertion of particular data;
(b) retrieving one of the templates;
(c) processing the command parameters to determine the template identity;
(d) accessing corresponding data based on the template identity;
(e) processing one of the tags in the template to determine the data to be inserted in place of the tag;
(f) extracting a corresponding portion of the accessed data and inserting the data into the template in place of the tag; and
(g) repeating steps (e) and (f) until all of the tags in the template have been processed.

26. The method of claim 25, further including repeating steps (b) through (g) until all of the templates have been processed.

27. The method of claim 25, wherein accessing corresponding data comprises accessing data in a playlist object.

28. The method of claim 25, wherein each template includes a hierarchy of tags.

29. The method of claim 25, wherein accessing corresponding data comprises accessing data relating to a multimedia presentation.

30. The method of claim 1, further including:
providing the executable file including executable code and a plurality of blocks of data;
running the executable code to identify one of the blocks;
processing identification information contained in the block to determine the contents of the block;
reading data in the block and creating a corresponding directory if the block is a destination directory block;
decompressing the data in the block and writing the decompressed data to an appropriate directory if the block is a compressed file block;
writing the data in the block to a temporary directory if the block contains a clean-up program; and
saving the information in the block if the information contains auto-start path information.

31. The method of claim 1, further including:
unpackaging the executable file;
beginning the display of data at a preselected position;
determining the current position of the display;
comparing the determined position with a set of event data for the respective digital assets;
displaying one of the digital assets based on the comparison of the position with the event data;
calculating a timeout based on the determined position and the event data;
setting a clock to fire upon reaching the timeout;
initiating a polling process when the clock fires to determine the position of the display;
displaying a different digital asset based on a comparison of the determined position with the event data; and
calculating a new timeout and resetting the clock to fire upon reaching the new timeout.

32. The method of claim 31, wherein comparing the determined position with the event data comprises comparing the determined position with the event data related to a slide.

33. The method of claim 31, wherein comparing the determined position with event data comprises comparing the determined position with event data related to text data.

34. The method of claim 31, wherein determining the current position comprises determining the position within a continuous stream media file.

35. The method of claim 34, wherein receiving the assets comprises receiving the assets over a communication network.

36. The method of claim 34, further comprising collecting timing information from the respective assets, and wherein assembling includes assembling the timing information.

37. The method of claim 34, wherein compressing the single file comprises compressing the single file using a compression format selected by an author of the presentation.

38. The method of claim 34, wherein receiving plural digital assets comprises receiving plural screen slides.

39. The method of claim 38, wherein processing the assets comprises copying text from the screen slides.

40. The method of claim 39, wherein copying the text comprises initially copying the text to a text object.

41. The method of claim 38, wherein storing the respective assets comprises storing the screen slides in a graphical file format.

42. The method of claim 34, wherein receiving plural digital assets comprises receiving spread sheet data.

43. The method of claim 34, wherein receiving plural digital assets comprises receiving plural video clips.

44. The method of claim 43, wherein processing the assets comprises extracting frames from the video clips.

45. The method of claim 43, wherein processing the assets comprises extracting closed captioning information from the video clips.

46. The method of claim 34, wherein receiving continuous stream media clips comprises receiving audio clips.

47. The method of claim 46, wherein processing the assets comprises extracting key words from the audio clips.

48. The method of claim 34, wherein receiving continuous stream media clips comprises receiving video clips.

49. The method of claim 34, wherein receiving continuous stream media clips comprises receiving clips of animation.

50. The method of claim 34, wherein receiving continuous stream media clips comprises receiving audio and video clips.

51. The method of claim 34, wherein receiving continuous stream media clips comprises receiving telemetry clips.

52. A method of processing data, comprising:
providing plural templates, each having command parameters and plural tags, wherein the tags include instructions for insertion of particular data;
retrieving one of the templates;
processing the command parameters to determine the template identity;
accessing corresponding data based on the template identity;
processing one of the tags in the template to determine the data to be inserted in place of the tag;
extracting a corresponding portion of the accessed data and inserting the data into the template in place of the tag;
repeating said processing one of the tags step and said extracting step until the tags in the template have been processed in order to create a presentation;
receiving plural sets of data corresponding to respective digital assets related to the presentation;
receiving continuous stream media data for one or more of the digital assets;
processing the sets of data to extract particular information from the data, and writing the extracted information to a data file;
compressing the continuous stream media data; and
assembling the digital assets, compressed data, and the data in the data file into an executable file.

53. The method of claim 52, wherein accessing corresponding data comprises accessing data in a playlist object.

54. The method of claim 52, wherein each template includes a hierarchy of tags.

55. The method of claim 52, wherein accessing corresponding data comprises accessing data relating to a multimedia presentation.

56. A method of processing data, comprising:
receiving plural sets of data corresponding to respective digital assets;
receiving continuous stream media data for one or more of the digital assets;
processing the sets of data to extract particular information from the data, and writing the extracted information to a data file;
compressing the continuous stream media data; and
assembling the digital assets, compressed data, and the data in the data file into an executable file;
providing the executable file including executable code and a plurality of blocks of data;
running the executable code to identify one of the blocks;
processing identification information contained in the block to determine the contents of the block;
reading data in the block and creating a corresponding directory if the block is a destination directory block;
decompressing the data in the block and writing the decompressed data to an appropriate directory if the block is a compressed file block;
writing the data in the block to a temporary directory if the block contains a clean-up program; and
saving the information in the block if the information contains auto-start path information.

57. A method of processing data, comprising:
receiving plural sets of data corresponding to respective digital assets;
receiving continuous stream media data for one or more of the digital assets;
processing the sets of data to extract particular information from the data, and writing the extracted information to a data file;
compressing the continuous stream media data; and
assembling the digital assets, compressed data, and the data in the data file into an executable file;
unpackaging the executable file;
beginning the display of data at a pre-selected position;
determining the current position of the display;
comparing the determined position with a set of event data for the respective digital assets;
displaying one of the digital assets based on the comparison of the position with the event data;

calculating a timeout based on the determined position and the event data;

setting a clock to fire upon reaching the timeout;

initiating a polling process when the clock fires to determine the position of the display; displaying a different digital asset based on a comparison of the determined position with the event data; and calculating a new timeout and resetting the clock to fire upon reaching the new timeout.

58. The method of claim 57, wherein comparing the determined position with the event data comprises comparing the determined position with the event data related to a slide.

59. The method of claim 57, wherein comparing the determined position with the event data comprises comparing the determined position with event data related to text data.

60. The method of claim 57, wherein determining the current position comprises determining the position within a continuous stream media file.

* * * * *

UNITED STATES PATENT AND TRADEMARK OFFICE
CERTIFICATE OF CORRECTION

PATENT NO. : 6,839,059 B1
DATED : January 4, 2005
INVENTOR(S) : Anderson et al.

It is certified that error appears in the above-identified patent and that said Letters Patent is hereby corrected as shown below:

Column 21,
Line 5, before the word "displaying", insert a new line.

Signed and Sealed this

Tenth Day of May, 2005

JON W. DUDAS
*Director of the United States Patent and Trademark Office*